(12) United States Patent
Meadowcroft et al.

(10) Patent No.: US 8,506,172 B2
(45) Date of Patent: Aug. 13, 2013

(54) OPTICAL TRANSCEIVER MODULE EQUIPPED WITH AN ELONGATED DELATCHING PULL TAB, AND A METHOD

(75) Inventors: David J. K. Meadowcroft, Santa Clara, CA (US); Seng-Kum Chan, San Jose, CA (US); Paul Yu, Mountain View, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 299 days.

(21) Appl. No.: 13/074,040

(22) Filed: Mar. 29, 2011

(65) Prior Publication Data

US 2012/0251049 A1   Oct. 4, 2012

(51) Int. Cl.
*G02B 6/36* (2006.01)
*G02B 6/00* (2006.01)

(52) U.S. Cl.
USPC .............................. 385/53; 385/92; 385/147

(58) Field of Classification Search
USPC ..................................... 385/53, 92
See application file for complete search history.

(56) References Cited

U.S. PATENT DOCUMENTS

| | | | |
|---|---|---|---|
| 5,666,272 A | 9/1997 | Moore et al. |
| 6,149,465 A | 11/2000 | Berg et al. |
| 6,335,869 B1 | 1/2002 | Branch et al. |
| 6,491,446 B1 | 12/2002 | Kryzak |
| 6,556,445 B2 | 4/2003 | Medina |
| 6,570,768 B2 | 5/2003 | Medina |
| 6,685,363 B2 | 2/2004 | Kryzak |
| 6,746,158 B2 | 6/2004 | Merrick |
| 6,994,478 B1 | 2/2006 | Chiu et al. |
| 7,008,248 B2 | 3/2006 | Kondas et al. |
| 7,147,502 B1 | 12/2006 | Wu |
| 7,204,712 B2 | 4/2007 | Schwiebert et al. |
| 7,215,554 B2 | 5/2007 | Torres et al. |
| 7,238,040 B1 | 7/2007 | Wu |
| 7,281,862 B2 | 10/2007 | Oen et al. |
| 7,281,937 B2 | 10/2007 | Reed et al. |
| 7,307,847 B2 | 12/2007 | Torres et al. |
| 7,354,292 B1 | 4/2008 | Lloyd et al. |

(Continued)

FOREIGN PATENT DOCUMENTS

| CN | 101499821 | 8/2009 |
|---|---|---|
| EP | 2 290 417 | 3/2011 |

OTHER PUBLICATIONS

Reflex Photonics, Inc., "QSFP (Quad Small Form-factor Pluggable)", *InterBOARD Active Optical Cable* 2005.

(Continued)

*Primary Examiner* — Rhonda Peace

(57) ABSTRACT

An optical transceiver module is provided with an elongated delatching pull tab that that enables an optical transceiver module to be easily delatched and pulled from a cage without having to first unplug optical fiber cables from the module and without having to rotate a bail. Thus, the number of manual actions that need to be performed by a user to remove the module from a cage is drastically reduced, which makes simplifies the removal process and makes the design well suited for use in hot-pluggable environments. In addition, the delatching pull tab obviates the need for pins or screws, thereby improving manufacturing yield by reducing the likelihood that the module will be damaged during the manufacturing process. In addition, by eliminating pins or screws and a bail from the design, there are fewer moving parts that can wear out over time.

20 Claims, 7 Drawing Sheets

(56) References Cited

U.S. PATENT DOCUMENTS

| | | |
|---|---|---|
| 7,402,070 B1 | 7/2008 | Wu |
| 7,416,353 B2 | 8/2008 | Yoshikawa |
| 7,445,389 B2 | 11/2008 | Aronson |
| 7,473,124 B1 | 1/2009 | Briant |
| 7,513,698 B2 | 4/2009 | Andersson |
| 7,566,226 B2 | 7/2009 | Roemer et al. |
| 7,690,939 B2 | 4/2010 | Wu |
| 7,736,171 B2 | 6/2010 | Reed et al. |
| 7,771,225 B1 | 8/2010 | Wu |
| 7,824,113 B2 * | 11/2010 | Wong et al. .............. 385/92 |
| 7,841,887 B2 | 11/2010 | Zhang et al. |
| 8,030,570 B2 | 10/2011 | Seraj et al. |
| 8,308,377 B2 * | 11/2012 | Yi ......................... 385/92 |
| 2002/0167793 A1 | 11/2002 | Branch et al. |
| 2003/0142917 A1 * | 7/2003 | Merrick ..................... 385/53 |
| 2005/0226587 A1 * | 10/2005 | Minota et al. ............. 385/134 |
| 2006/0252311 A1 | 11/2006 | Togami et al. |
| 2006/0258201 A1 | 11/2006 | Schwiebert et al. |
| 2008/0031577 A1 * | 2/2008 | Walker et al. .............. 385/92 |
| 2009/0188106 A1 | 7/2009 | Wang et al. |
| 2009/0227133 A1 | 9/2009 | Zhang et al. |
| 2009/0290619 A1 | 11/2009 | Flens |
| 2009/0291578 A1 | 11/2009 | Wu |
| 2010/0246142 A1 | 9/2010 | Phillips |
| 2011/0080008 A1 | 4/2011 | Teo |
| 2011/0267742 A1 | 11/2011 | Togami et al. |
| 2012/0027362 A1 | 2/2012 | Yi |
| 2012/0164860 A1 * | 6/2012 | Wang et al. .............. 439/159 |
| 2012/0251049 A1 * | 10/2012 | Meadowcroft et al. ......... 385/53 |

OTHER PUBLICATIONS

Zarlink Semiconductor, Inc., "ZL60620 ZLynx QSFP Optical Cable (4+4) ×5 Gbps Data Sheet", Mar. 2009, 2 pages.

* cited by examiner

US 8,506,172 B2

OPTICAL TRANSCEIVER MODULE EQUIPPED WITH AN ELONGATED DELATCHING PULL TAB, AND A METHOD

TECHNICAL FIELD OF THE INVENTION

The invention relates to optical transceiver modules. More particularly, the invention relates to an optical transceiver module equipped with an elongated delatching pull tab.

BACKGROUND OF THE INVENTION

State-of-the-art digital communication switches, servers, and routers currently use multiple rows of duplex LC connector optical transceivers to meet information bandwidth and physical density needs. To be a commercially fungible product, the optical transceivers must have basic dimensions and mechanical functionality that conform to an industry standard Multi-Source Agreement (MSA) such as set forth in the Small Form Factor (SFF) committee's INF-8074i "SFP Transceiver" document. Many optical transceiver designs that comply with and add value beyond the basic mechanical functionally set forth in the MSA are possible.

FIG. 1 illustrates a standard configuration for a system 1 including an optical transceiver module 10 having a conventional delatch mechanism and a cage 12. Optical transceiver module 10 contains a transceiver that converts optical data signals received via an optical fiber (not shown) into electrical signals for an electrical switch (not shown) and converts electrical data signals from the switch into optical data signals for transmission. Cage 12 would typically be part of the switch and may be mounted in closely spaced rows above and below a printed circuit board.

When plugging module 10 into a switch, an operator slides module 10 into cage 12 until a post 14 on module 10 engages and lifts a latch tab 22 on cage 12. Module 10 then continues sliding into cage 12 until post 14 is even with a hole 24 in latch tab 22 at which point latch tab 22 springs down to latch module 10 in place with post 14 residing in hole 24. Post 14 is shaped such that an outward force on module 10 does not easily remove module 10 from cage 12. Module 10 has a delatch mechanism 30, which resides in a channel extending away from post 14. In a latched position, delatch mechanism 30 is outside cage 12, and post 14 is in hole 24. To remove module 10, delatch mechanism 30 is slid toward cage 12 until wedges 32 on delatch mechanism 30 slide under and lift latch tab 22 to a level above post 14. Module 10 can then be slid out and removed from cage 12.

Operation of delatch mechanism 30 can be awkward since removal of module 10 requires pushing in on delatch mechanism 30 while pulling out module 10. Additionally, when module 10 is in an array of modules in an optical switch, modules above module 10 will often block easy access to delatch mechanism 30, making removal of module 10 more difficult. Surrounding modules also make each module more difficult to grip.

Other module delatch mechanisms have been developed in attempts to simplify the removal procedure. One such module has a flexible strip that is attached to the module and resides under the latch tab in the latched position. To delatch the module, an operator pulls up and out on the flexible strip, and the flexible strip lifts the latch tab off the post on the module. Releasing the latch tab and removing the module in this manner requires significant upward force. For many operators, the operation of this delatch mechanism is not intuitive since pulling directly out on the flexible tab will not release the module. Additionally, in a high-density configuration, surrounding modules can make the flexible tab difficult to grip.

Another "pull-to-detach" mechanism provides the module with a post on a lever arm and a flexible handle mounted to a rod. When the flexible handle is pulled, the rod forces the lever arm to rotate and lower the post away from the cage, releasing the module from the latch on the cage. The pulling force on the flexible handle then slides the module out of the cage. Return springs that hold the lever arm and the post in position are features molded into the plastic housing. This system requires an operator to apply a great deal of force to remove the module.

FIGS. 2A and 2B illustrate cutaway bottom perspective views of a known optical transceiver module 110 having a delatch mechanism 130 that does not require excessive force to extract from a cage 120 and that is easily accessible in high density module arrangements. The module 110 and the delatch mechanism 130 are disclosed in U.S. Pat. No. 6,746,158 by the assignee of the present application and is incorporated herein by reference in its entirety.

In FIG. 2A, the delatch mechanism 130 is in a latched configuration. In FIG. 2B, the delatch mechanism 130 is in a delatched configuration. Half of cage 120 is cut away in FIGS. 2A and 2B to better show the module 110 and the delatch mechanism 130. Cage 120 includes a latch tab 122 (half of which is shown in FIG. 2A) including a hole 124 that can accommodate a post 114. Although FIG. 2A illustrates cage 120 as being isolated, cage 120 would typically be one of several substantially identical cages arranged in a dense array of cages. The delatch mechanism 130 includes an integrated structure 140 and a bail 150. Integrated structure 140 includes features such as ridges 142 and 144, spring arms 146, and wedges 148. Bail 150 is friction fit through a hole in integrated structure 140 and can be flipped down as shown in FIG. 2A to keep the bail 150 out of the way, or flipped up as shown in FIG. 2B to extend out and facilitate pulling on delatch mechanism 130 during removal of module 110. Ridges 142 and 144 also provide grip points for pulling delatch mechanism 130 when bail 150 is down or is otherwise inconvenient for gripping. An LC fiber connector (not shown) can attach to module 110 through the center of bail 150.

Spring arms 146 have ends in notches 116 in module 110. (The cut away view of FIG. 2A shows only one of notches 116, the other notch being omitted to better illustrate integrated structure 140.) Spring arms 146 flex in response to a pulling force on delatch mechanism 130 and permit a limited range of motion for delatch mechanism 130 relative to module 110. In the latched configuration shown in FIG. 2A, spring arms 146 can be uncompressed or have some spring loading, and wedges 148 reside in pockets 112 in module 110. Above wedges 148 is latch tab 122, half of which is illustrated in FIG. 2A. Through latch tab 122 is hole 124, in which post 114 resides when module 110 is latched in cage 120.

To remove the module 110 from the cage 120, an operator pulls out on delatch mechanism 130 via bail 150 or ridges 142 and/or 144. Initial pulling bends/flexes spring arms 146 and slides wedges 148 out of their respective pockets 112. As wedges 148 rise out of pockets 112, wedges 148 push up on latch tab 122. In FIG. 2B, the spring arms 146 have reached a limit of their compression and wedges 148 have lifted latch tab 122 above post 114. The spring arms 146 are at angles such that pulling on integrated structure 140 flexes spring arms 146 about their respective bases and extends the ends of spring arms 146 further into notches 116 in module 110. Accordingly, pulling more firmly engages spring arms 146 in notches 116. In the illustrated configuration of FIG. 2B, spring arms 146 contact fixed portions 147 of delatch mechanism 130 and cannot flex further. The pulling force thus acts on module 110 to slide module 110 out of cage 120.

FIG. 3 illustrates a top perspective view of a known Quad Small Form-Factor Pluggable (QSFP) optical transceiver module 160 currently used in the optical communications industry. An optical fiber cable 163 is attached to the module 160 and includes a plurality of transmit optical fibers (not shown for purposes of clarity) and a plurality of receive optical fibers (not shown for purposes of clarity). The module 160 has a housing 165 that includes a first housing portion 165a and a second housing portion 165b, which are connected together by fastening elements (not shown). The first and second housing portions 165a and 165b are typically made of cast aluminum, cast zinc, or a cast zinc alloy. A delatch device 166 allows the module housing 165 to be delatched from a cage (not shown) to enable the module housing 165 to be removed from the cage. A flexible plastic pull tab 167 is connected on its proximal end 167a to the delatch device 166. When a user pulls on the distal end 167b of the pull tab 167 in the direction indicated by arrow 168, slider portions 166a and 166b of the delatch device 166 move to a limited extent in the direction indicated by arrow 168 (only slider portion 166a can be seen in FIG. 3). This movement of the slider portions 166a and 166b causes outwardly curved ramps 166a' and 166b' of the slider portions 166a and 166b, respectively, to press outwardly against respective catch features on the cage (not shown) to allow the housing 165 to be retracted from the cage.

With respect to FIG. 1, because the module 1 does not have a bail or a pull tab, removing it from the cage 12 when arranged in a densely-packed array or cages can be very challenging. With reference to FIGS. 2A and 2B, although the delatch mechanism 130 works well with regard to delatching and removing the module 110 from the cage 120, the bail 150 is fairly short, which can make the task of removing the module 110 from the cage 120 difficult in situations where many such modules are positioned adjacent one another in a densely-packed array. In addition, the module 110 cannot even be removed from the cage 120 without first unplugging the optical fiber cables (not shown) from the cage 120 to enable the bail 150 to be moved to the delatch position. This makes it more difficult to use the module 110 in hot-pluggable environments. Another problem associated with some optical transceiver modules that use bail-type delatching configurations is that the bail is often coupled to the module housing by pins or screws that can damage the housing, resulting in lower yield. With respect to FIG. 3, the pins 171 that are used to attach the flexible plastic pull tab 167 to the module housing 165 sometimes damage the housing 165, resulting in lower yield.

Accordingly, a need exists for a delatching device that has a configuration that enables a user to easily pull an optical transceiver module from a cage in a densely-packed array and that overcomes the aforementioned disadvantages. A need also exists for a delatching device that is well-suited for use in hot-pluggable environments and which does not require removal of the optical fiber cables in order to delatch the optical transceiver module from a cage. A need also exists for a delatching device that is attachable to the optical transceiver module without the need for pins or screws that can damage the module housing and reduce production yield.

SUMMARY OF THE INVENTION

The invention is directed to an optical transceiver module comprising an elongated delatching pull tab and a method. The optical transceiver module is adapted to be mated with a cage and comprises the elongated delatching pull tab, a pair of cantilever spring arms, a slider, and a module housing. The elongated delatching pull tab comprises an elongated handle having a proximal end and a distal end and a substantially rigid structure, and a pair of cantilever spring arms disposed on the distal end of the elongated handle. The pair of cantilever spring arms is capable of being positioned in an unloaded state and in a fully-loaded state. The slider has first and second side members that are in parallel planes and a transverse member that interconnects the first and second side slide members. The transverse member is mechanically coupled to the distal end of the elongated handle. The first and second side slide members have delatching features formed thereon. The module housing is mechanically coupled to the slider and to the distal end of the elongated handle. If a force is exerted on the proximal end of the elongated handle in a first direction and with a magnitude sufficient to cause the pair of cantilever spring arms to be positioned in the fully-loaded state, the slider is pulled in a direction that is parallel to the first direction causing the delatching features formed on the first and second side slide members to press outwardly against first and second opposing sides of the cage. This causes the module housing to be delatched from the cage to enable to module to be extracted from the cage. If the force exerted on the proximal end is removed, the pair of cantilever spring arms repositions itself into the unloaded state.

The method comprises providing an optical transceiver module mated with a cage and having a distal end of an elongated handle of a delatching pull tab coupled thereto, and exerting a force on a proximal end of the elongated handle in a first direction and with a magnitude sufficient to cause a pair of cantilever spring arms disposed on the distal end of the elongated handle to be positioned in a fully-loaded state. Exertion of the force on the proximal end of the elongated handle causes a slider of the module to be pulled in a direction that is parallel to the first direction, thereby causing delatching features formed on first and second side slide members of the slider to press outwardly against the first and second side walls of the cage to delatch the module housing from the cage. If the force exerted on the proximal end is removed, the pair of cantilever spring arms repositions itself into the unloaded state.

These and other features and advantages of the invention will become apparent from the following description, drawings and claims.

DETAILED DESCRIPTION OF AN ILLUSTRATIVE EMBODIMENT

In accordance with the invention, an optical transceiver module is provided with an elongated delatching pull tab that enables an optical transceiver module to be easily delatched and pulled from a cage without having to first unplug optical fiber cables from the module and without having to rotate a bail. Thus, the number of manual actions that need to be performed by a user to remove the module from a cage is drastically reduced, which makes simplifies the removal process and makes the design well suited for use in hot-pluggable environments. The delatching pull tab obviates the need for a bail and is coupled to the optical transceiver module with a coupling mechanism that does not use pins or screws. Because pins or screws are not needed to secure the delatching pull tab to the module, there is a reduced likelihood of the module being damaged during the manufacturing process, which improves manufacturing yield. In addition, by eliminating pins or screws and a bail from the design, there are fewer moving parts that can wear out over time.

Figure 4:
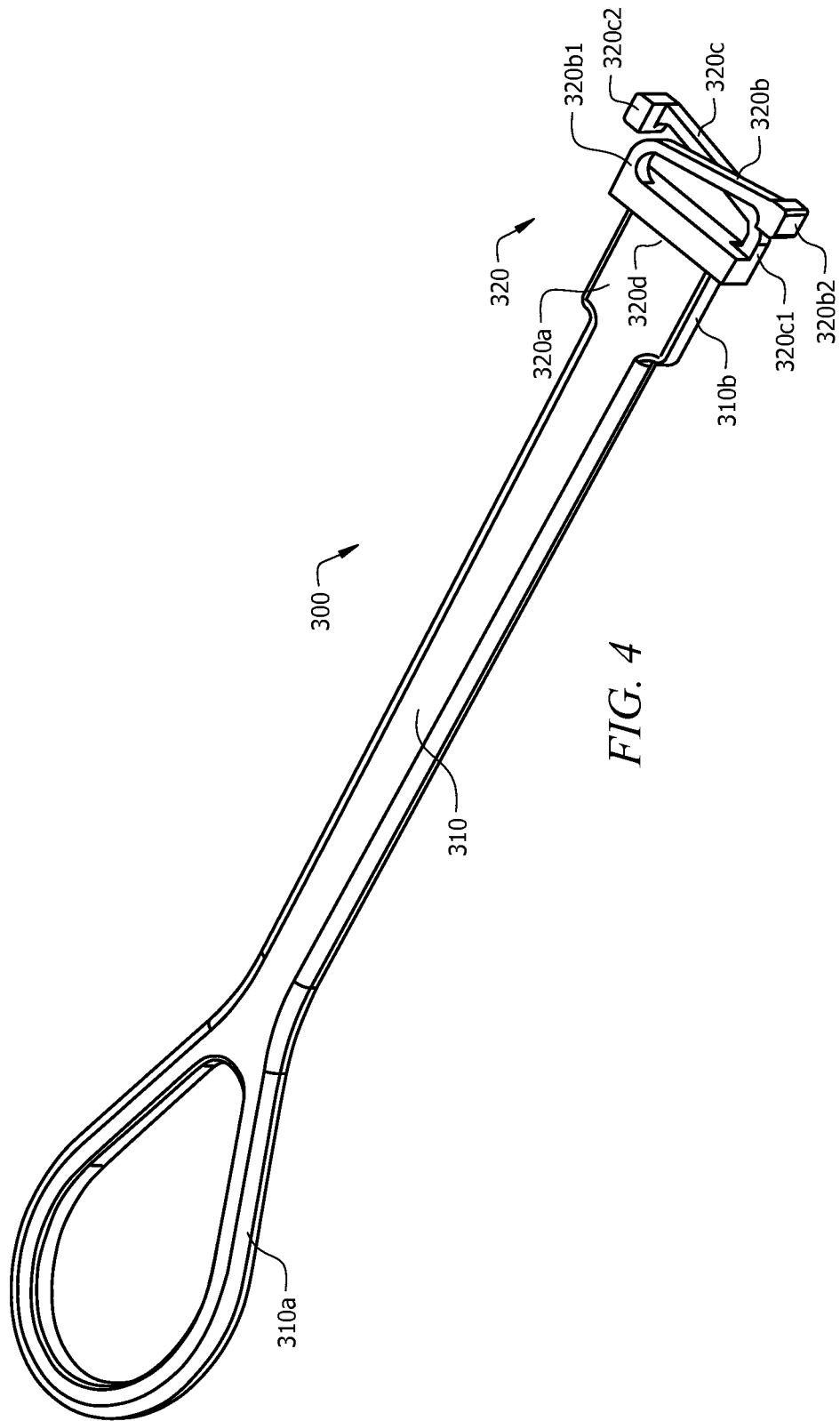
FIG. 4 illustrates a top perspective view of the elongated delatching pull tab having cantilever spring arms in accordance with an illustrative embodiment.

FIG. 4 illustrates a top perspective view of the elongated delatching pull tab 300 in accordance with an illustrative embodiment. The delatching pull tab 300 includes an elongated handle 310 and a module coupling mechanism 320. The elongated handle 310 has a proximal end 310a and a distal end 310b. The distal end 310b has the module coupling mechanism 320 disposed thereon. In accordance with this illustrative embodiment, the module coupling mechanism 320 has a base 320a and first and second cantilever spring arms 320b and 320c that are attached on their proximal ends 320b1 and 320c1 to the base 320a. The cantilever spring arms 320b and 320c are in parallel planes that overlap. The cantilever spring arms 320a and 320b have distal ends 320b2 and 320c2 that press against walls (not shown) of the optical transceiver module housing (not shown), as will be described below in more detail with reference to FIGS. 7A and 7B. The base 320a has a slot 320d formed in it that couples to a slider (not shown), as will be described below with reference to FIG. 6.

Figure 1:
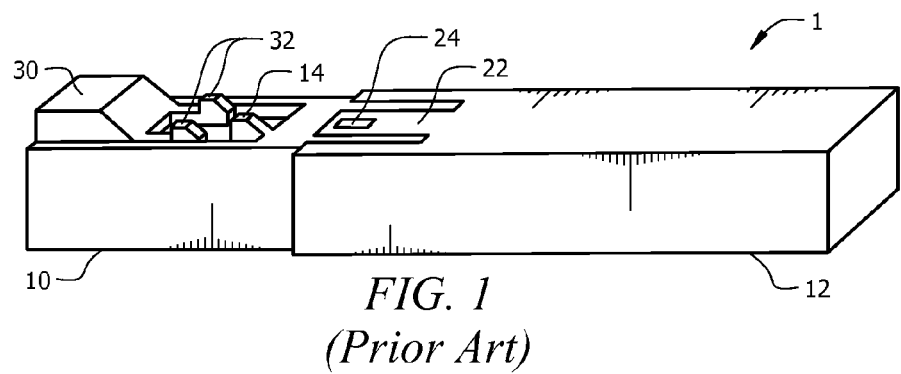
FIG. 1 illustrates a perspective view of a known optical transceiver module with a conventional delatch mechanism.
Figure 2A:
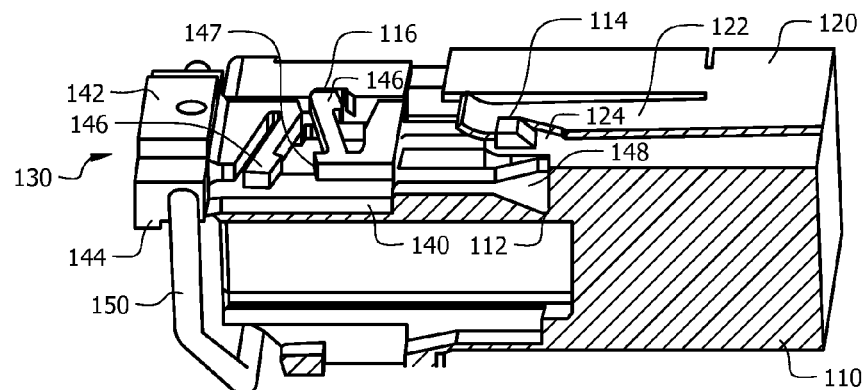
FIGS. 2A and 2B illustrate cut-away, perspective views of portions of a known optical transceiver module with a known delatch mechanism in latched and unlatched positions, respectively.
Figure 2B:
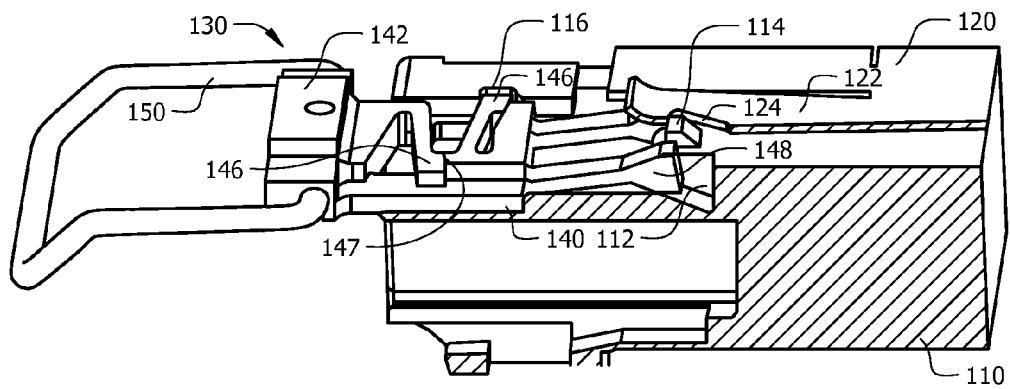
Figure 3:
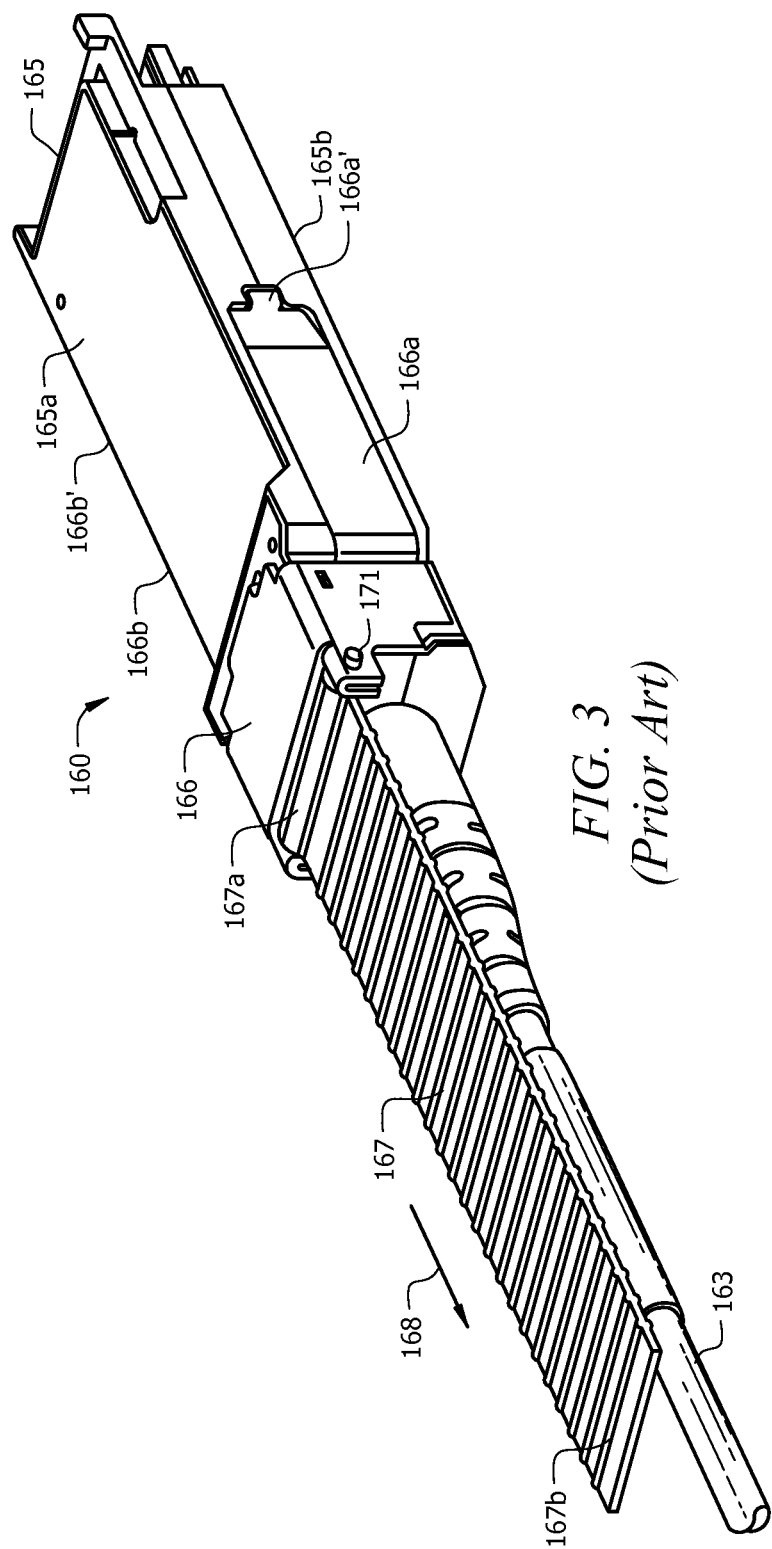
FIG. 3 illustrates a top perspective view of a known optical transceiver module with a known delatch mechanism that includes a flexible plastic pull tab.

The elongated handle 310 provides a user with easy manual access to allow the delatching pull tab 300 to be used to push or pull an optical transceiver module into or out of a cage (not shown), even in cases in which the cages are arranged in very densely-packed arrays. The elongated handle 310 obviates the need for a user to have direct manual access to the front face or the bail of an optical transceiver module in order to insert or extract the module into or from the cage. The elongated handle 310 has a length, L, that is significantly longer than the length of the extended bail 150 shown in FIG. 2B. Typically, the length L of the elongated handle 310 ranges from about 15 millimeters (mm) to about 300 mm, although the invention is not limited to the handle 310 having any particular length or range of length. Unlike the bail 150 shown in FIG. 2B, the elongated handle 310 does not rotate, but has the substantially rigid elongated configuration shown in FIG. 4. The base 320a adds stiffness to the handle 310 to prevent the handle 310 from buckling or bending when a pull or push force is exerted on the proximal end 310a of the handle 310 to pull or push an optical transceiver module from or into a cage.

The delatching pull tab 300 may have a unibody construction, i.e., be made as a single piece part. Making the delatching pull tab 300 as a single piece part will typically reduce manufacturing costs. It may, however, be desirable to make the delatching pull tab 300 of multiple piece parts for certain applications, such as, for example, in applications that require a longer length for the elongated handle 310. The delatching pull tab 300 is not limited with respect to the type of material of which it is made. The delatching pull tab 300 may be made of, for example, polycarbonate, sheet metal, and a wide range of different plastic materials. The delatching pull tab 300 is generally rigid, but also has some amount of elasticity to allow the cantilever spring fingers to move from unbiased to biased state, and vice versa, as will be described below in more detail with reference to FIGS. 7A and 7B.

Figure 5:
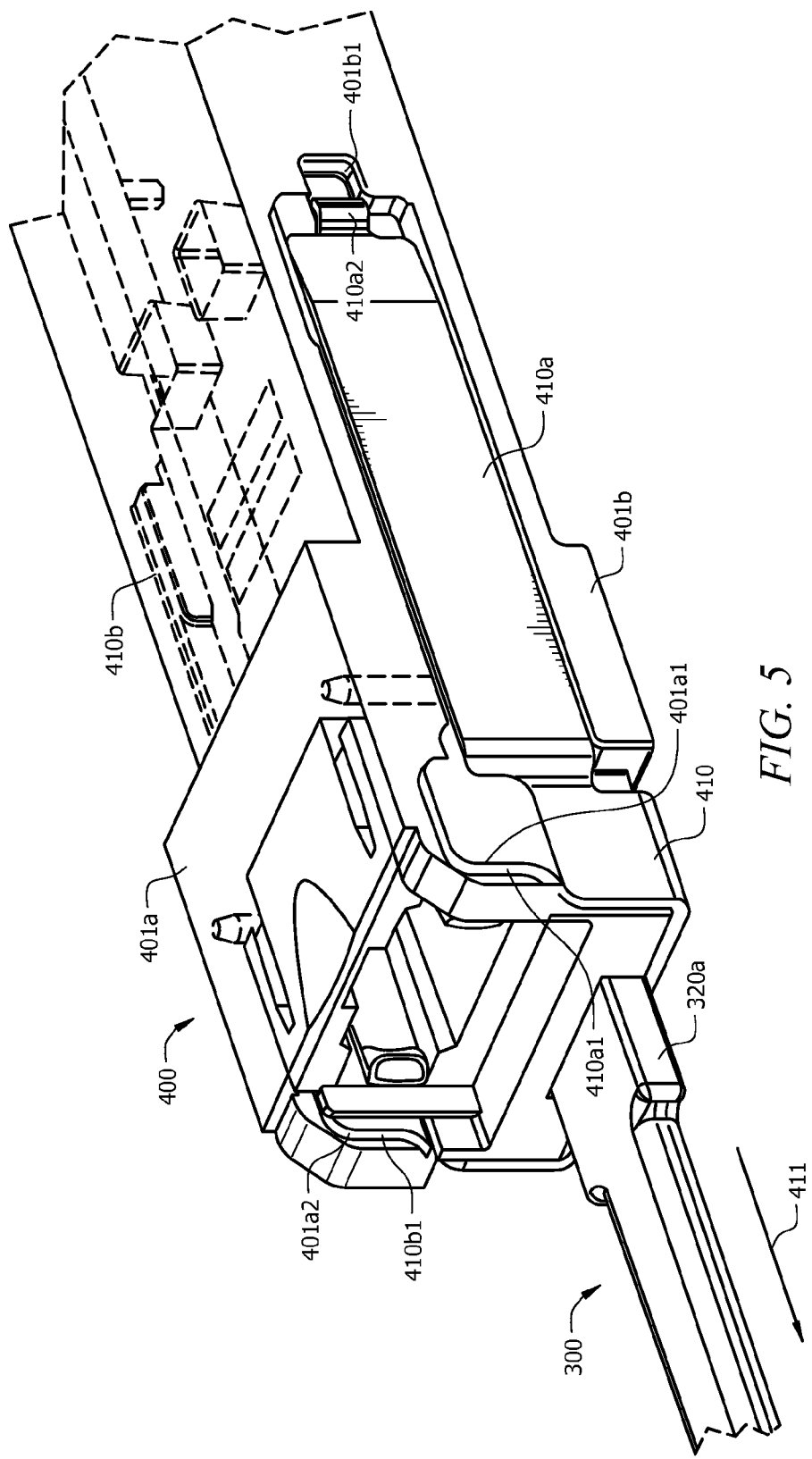
FIG. 5 is a top perspective view of the delatching pull tab shown in FIG. 4 mechanically coupled to an optical transceiver module.
Figure 6:
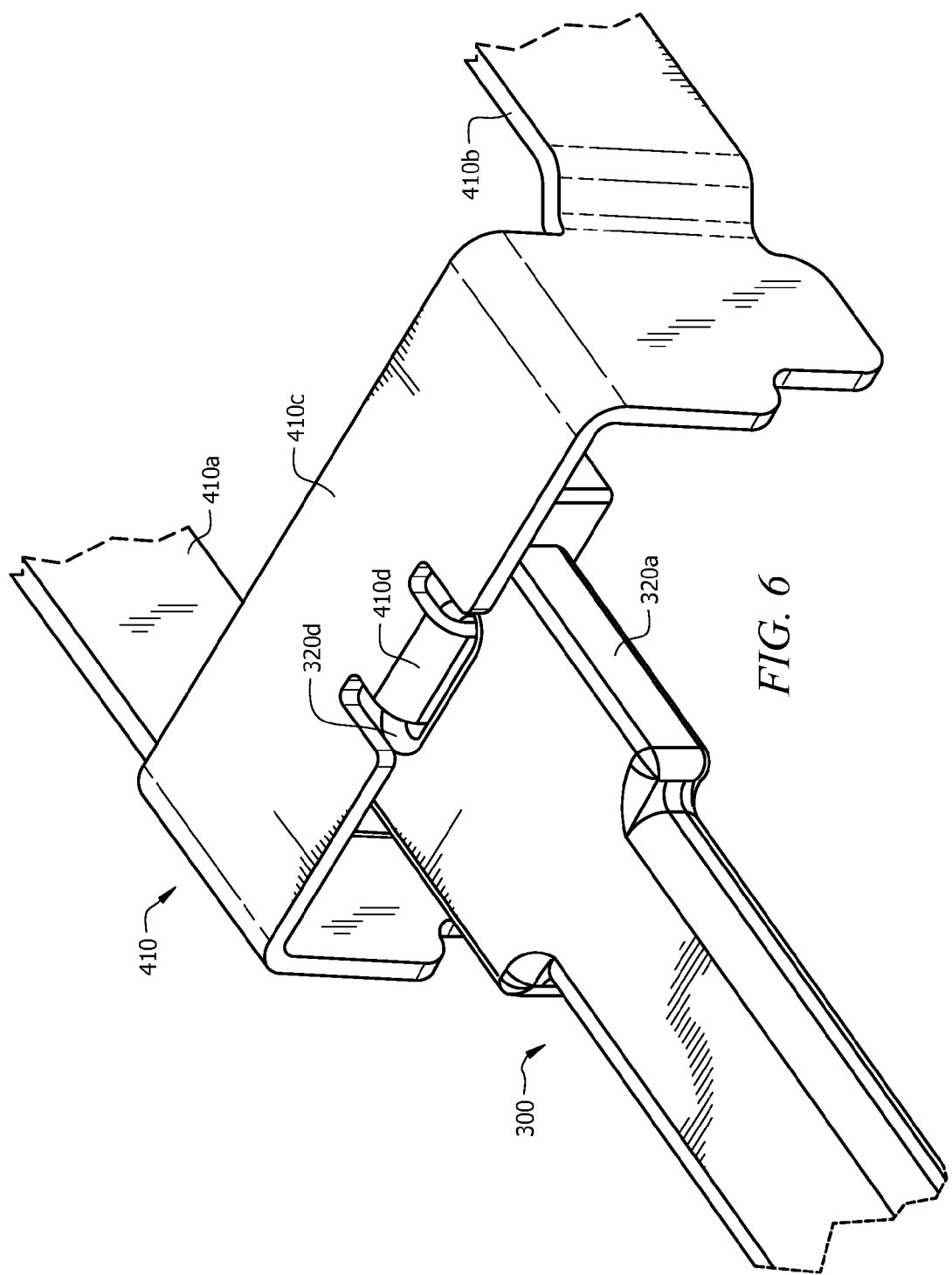
FIG. 6 is a bottom perspective view of a slider mechanically coupled to the module coupling mechanism of the delatching pull tab shown in FIGS. 4 and 5.
Figure 7A:
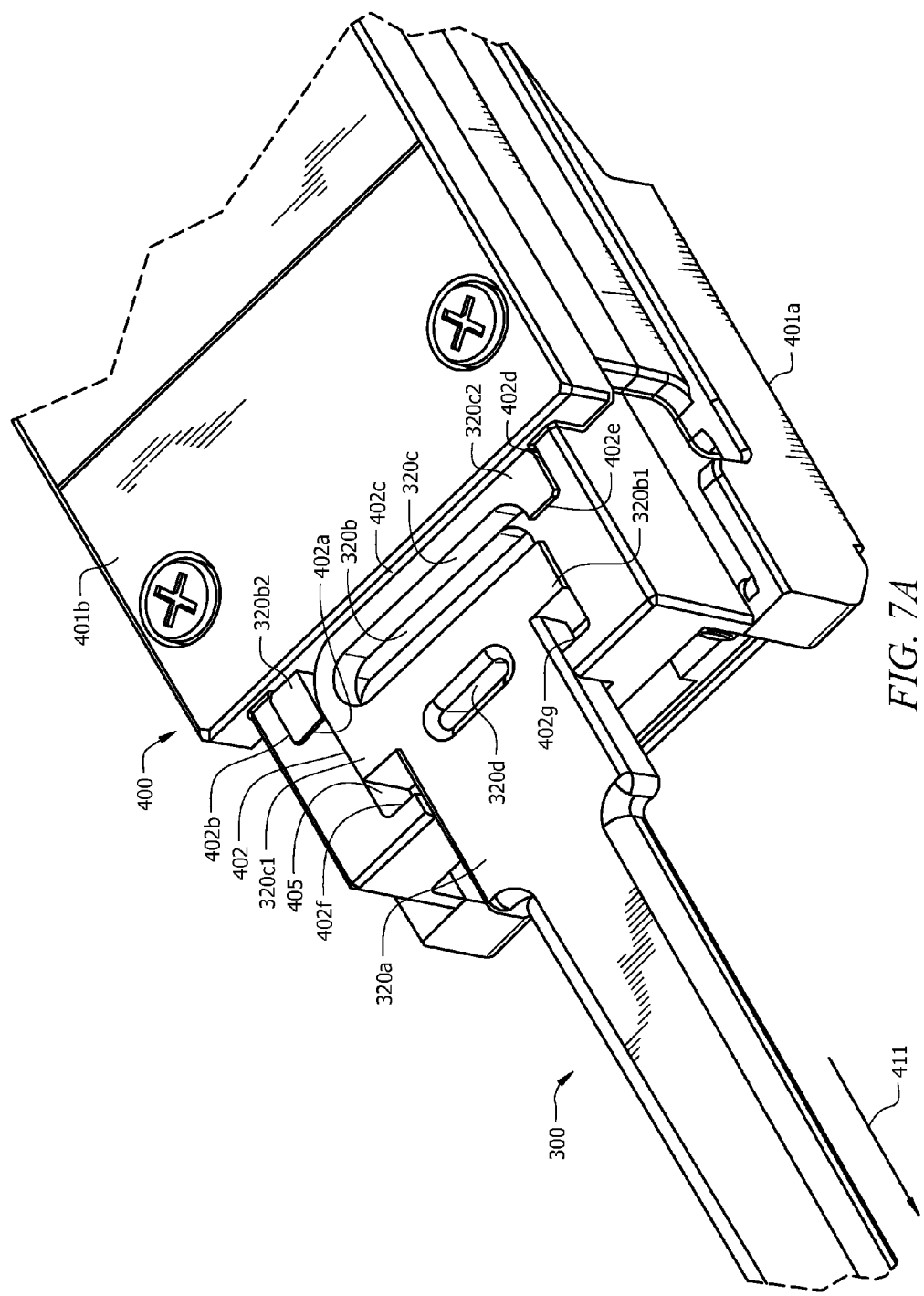
FIGS. 7A and 7B are bottom perspective views of the optical transceiver module shown in FIG. 5 with the slider removed to show the cantilever spring arms shown in FIG. 4 in their unloaded and loaded states, respectively.
Figure 7B:
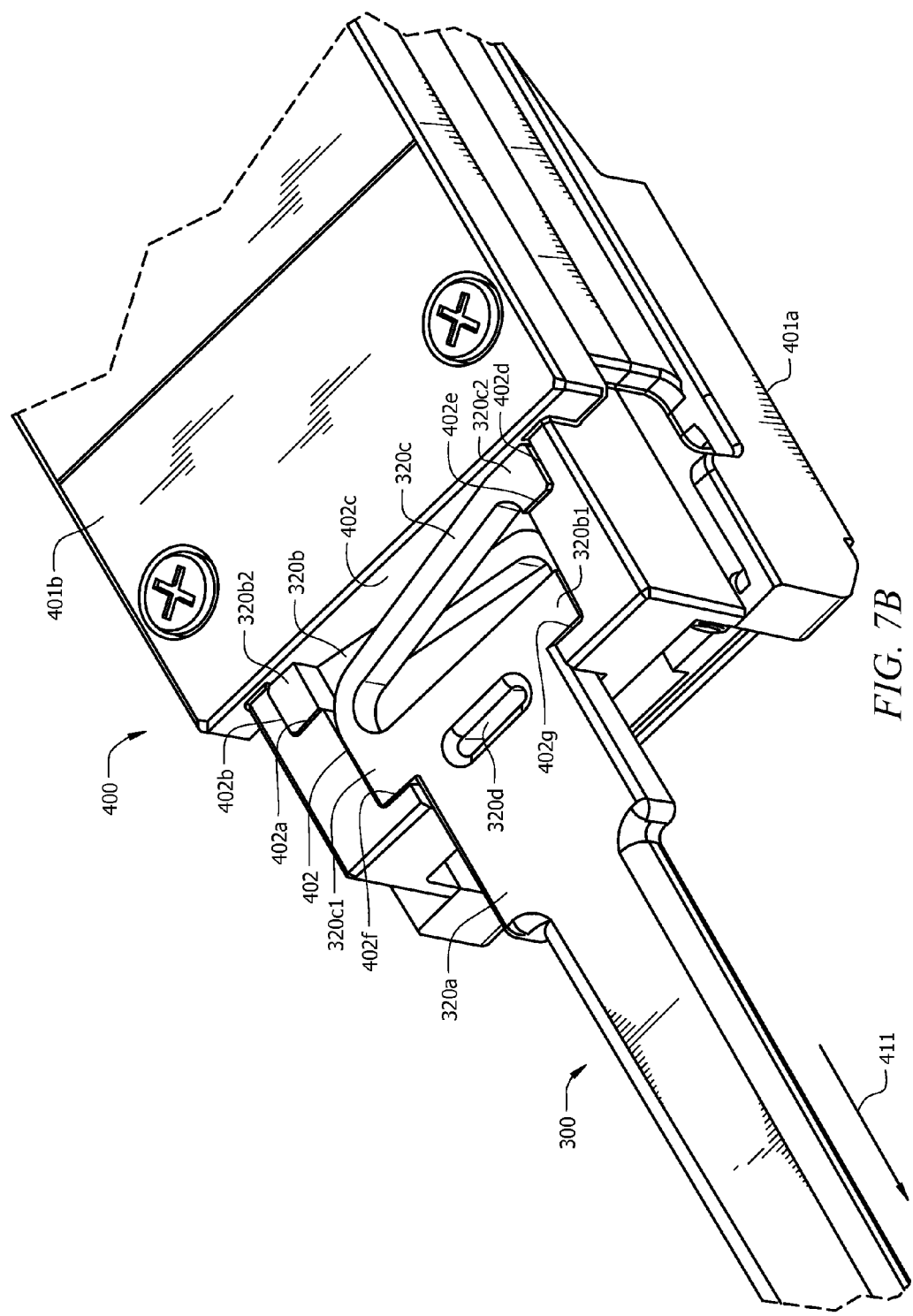

FIG. 5 is a top perspective view of the delatching pull tab 300 shown in FIG. 4 mechanically coupled to an optical transceiver module 400. The module coupling mechanism 320 disposed on the distal end 310b of the delatching pull tab 300 couples to a slider 410 of the optical transceiver module 400. FIG. 6 is a bottom perspective view of the slider 410 that shows the manner in which the module coupling mechanism 320 mechanically couples with the slider 410. FIGS. 7A and 7B are bottom perspective views of the optical transceiver module 400 without the slider 410 to show the cantilever spring arms 320b and 320c in their unloaded and loaded states, respectively.

With reference to FIG. 5, the optical transceiver module 400 has a module housing 401 comprising a first housing portion 401a and a second housing portion 401b. The first and second housing portions 401a and 401b are typically made of a cast metallic material (e.g., cast aluminum, cast zinc, or a cast zinc alloy), but may be made of other materials, such as sheet metal, for example. The first housing portion 401a has been made transparent in FIG. 5 to allow internal surfaces of the first housing portion 401 to be seen. The first and second housing portions 401a and 401b may be secured to one another in a number of ways, but are typically configured with typical snap-fit designs that enable them to be secured to one another via mating male and female elements (not shown) that snap together.

With reference to FIG. 6, the slider 410 has first and second longitudinal members 410a and 410b that extend in planes that are parallel to one another. The slider 410 is typically made of sheet metal. A transverse member 410c of the slider 410 interconnects the first and second longitudinal members 410a and 410b. The slider 410 has a structure that is similar or identical to known sliders, except that the slider 410 also includes a metal tab 410d disposed on the transverse member 410c and contoured edges 410a1 and 410b1. The metal tab 410d hooks through the slot 320d formed in the base 320a of the delatching pull tab 300 to mechanically couple the slider 410 to the delatching pull tab 300.

With reference to FIG. 7A, the cantilever spring arms 320b and 320c are retained by the transverse member 410c (FIG. 6) within a recess 402 formed in a bottom surface of the second housing portion 401b. Within the recess 402, the distal ends 320b2 and 320c2 abut walls 402a-402e of the recess 402 and are maintained in the position shown in FIG. 7A by the walls 402a-402e and by the transverse member 410c of the slider 410. The walls 402a-402c of the recess 402 define a sub-recess that is complimentary in shape to the shape of the distal end 320b2. Likewise, the walls 402c-402e define a sub-recess that is complimentary in shape to the shape of distal end 320c2.

When no pull force is exerted on the delatching pull tab 300 in the direction indicated by arrow 411, the cantilever spring arms 320b and 320c are in an unloaded state, as shown in FIG. 7A. In the unloaded state, a gap 405 exists between the proximal ends 320b1 and 320c1 of the cantilever spring arms 320b and 320c, respectively, and the walls 402f and 402g of the recess 402. When a pull force is exerted on the delatching pull tab 300 in the direction indicated by arrow 411, the cantilever spring arms 320b and 320c move to a loaded state, as shown in FIG. 7B. In the fully-loaded state, the proximal ends 320b1 and 320c1 of the cantilever spring arms 320b and 320c, respectively, are in abutment with walls 402f and 402g of the recess 402.

With reference again to FIG. 5, when the cantilever spring arms 320b and 320c are in the fully-loaded state shown in FIG. 7B, continued exertion of force on the delatching pull tab 300 in the direction indicated by arrow 411 pulls the slider 410 in the direction indicated by arrow 411 until the contoured edges 410a1 and 410b1 of the slider longitudinal members 410a and 410b, respectively, come into abutment with respective stops 401a1 and 401a2 formed in the first housing portion 401a. The stops 401a1 and 401a2 are generally complementary in shape to the shapes of the contoured edges 410a1 and 410b1, respectively. Movement of the slider 410 in this direction causes ramps 410a2 formed on the longitudinal members 410a and 410b, respectively, to press outwardly against the side walls of the cage (not shown) causing respective catches (not shown) disposed on the side walls of the cage to disengage respective indentations 401b1 formed in opposite sides of the second housing portion 401b. Once the contoured edges 410a1 and 410b1 are in abutment with the respective stops 401a1 and 401a2, continued exertion of pull force in the direction indicated by arrow 411 causes the optical transceiver module 400 to be extracted from the cage.

If the cantilever spring arms 320b and 320c are in the fully-loaded state shown in FIG. 7B and the force exerted on delatching pull tab 300 in the direction of arrow 411 is removed, the cantilever spring arms 320b and 320c will automatically return to the unloaded state shown in FIG. 7A. This ensures that the module 400 will remain securely mated with the cage unless a sufficient pull force is exerted on the delatching pull tab 300 in the direction of arrow 411 to extract the module 400 from the cage. The cantilever spring fingers 320b and 320c obviate the need for mechanical springs, which reduces the number of piece parts needed. Reducing the number of piece parts needed reduces the overall manufacturing cost of the module 400.

There are many other advantages to the design shown in FIGS. 4-7B over existing designs. One advantage is that the elongated delatching pull tab 300 facilitates removal of the module 400 from a cage in densely-packed environments. Another advantage is that, because there is no bail, the process of delatching the module 400 and extracting it from a cage can be performed quickly without having to first unplug the optical fiber cables from the module 400. This latter feature makes the module 400 well suited for use in hot-pluggable environments. Yet another advantage derives from the manner in which the slider 410 mechanically couples to the second housing portion 401b and to the delatching pull tab 300. This mechanical coupling design eliminates the need for screws or pins to attach the delatching mechanism to the module, which reduces the possibility of the module 400 being damaged during assembly, thereby improving production yield. Yet another advantage of the design is that it uses fewer moving parts that can wear out over time.

It should be noted that while the invention has been described with reference to an optical transceiver module, the invention is not limited to use with optical transceiver modules, but may also be used with optical receiver modules and optical transmitter modules. Therefore, the term "optical transceiver module", as that term is used herein, describes any of the following: (1) a module that has both optical transmit and optical receive capability for transmitting and receiving optical signals over an optical waveguide; (2) a module that has optical transmit, but not optical receive, capability for transmitting optical signals over an optical waveguide; and (3) a module that has optical receive, but not optical transmit, capability for receiving optical signals over an optical waveguide.

It should be noted that the invention has been described with reference to a few illustrative embodiments for the purposes of demonstrating the principles and concepts of the invention. As indicated above, many modifications may be made to the embodiments described herein without deviating from the scope of the invention. For example, while the elongated delatching pull tab 300 is shown in the figures as having a particular shape, the delatching pull tab may have a variety of elongated different shapes that allow the goals of the invention to be achieved. Also, while the cantilever spring arms 320b ad 320c are shown as having particular configurations, other configurations that achieve the same goals are possible. Persons skilled in the art will understand, in view of the description provided herein, the manner in which these and other modifications may be made and that all such modifications are within the scope of the invention.

What is claimed is:

1. An optical transceiver module adapted to be mated with a cage, the module comprising:
    an elongated delatching pull tab comprising:
        an elongated handle having a proximal end and a distal end, the elongated handle having a substantially rigid structure; and
        a pair of cantilever spring arms disposed on the distal end of the elongated handle, the pair of cantilever spring arms being capable of being be positioned in an unloaded state and in a fully-loaded state;
    a slider having first and second side slide members that are in parallel planes and a transverse member interconnecting the first and second side slide members, the transverse member being mechanically coupled to the distal end of the elongated handle, the first and second side slide members having delatching features formed thereon; and
    a module housing mechanically coupled to the slider and to the distal end of the elongated handle, wherein if a force is exerted on the proximal end of the elongated handle in a first direction and with a magnitude sufficient to cause the pair of cantilever spring arms to be positioned in the fully-loaded state, the slider is pulled in a direction that is parallel to the first direction causing the delatching features formed on the first and second side slide members to press outwardly against first and second opposing sides of the cage, thereby causing the module housing to be delatched from the cage to enable to module to be extracted from the cage.

2. The optical transceiver module of claim 1, wherein if the force exerted on the proximal end is removed, the pair of cantilever spring arms repositions itself into the unloaded state.

3. The optical transceiver module of claim 1, wherein the elongated delatching pull tab is a unitary piece part of which the elongated handle and the pair of cantilever spring arms are integral parts.

4. The optical transceiver module of claim 1, wherein the elongated handle and the pair of cantilever spring arms are separate parts.

5. The optical transceiver module of claim 1, wherein the delatching pull tab is made of plastic.

6. The optical transceiver module of claim 1, wherein the delatching pull tab is made of a metallic material.

7. The optical transceiver module of claim 1, wherein the transverse member of the slider is mechanically coupled to the distal end of the elongated handle by a tab on the transverse member that hooks through a slot formed in the distal end of the elongated handle.

8. The optical transceiver module of claim 1, wherein the delatching features formed on the first and second side slide members are first and second ramps that extend outwardly away from the first and second side slide members.

9. The optical transceiver module of claim 1, wherein the module housing comprises first and second housing portions that are fixedly secured to one another, and wherein the distal end of the elongated handle is mechanical coupled to a bottom surface of the second housing portions.

10. The optical transceiver module of claim 9, wherein the bottom surface of the second housing portion has a recess formed therein in which the pair of cantilever spring arms sit, and wherein the transverse member of the slider at least partially covers the recess to maintain the pair of cantilever spring arms in the recess, the recess having a shape and size that allows the pair of cantilever spring arms to move within the recess between the unloaded and fully-loaded states.

11. A method for delatching an optical transceiver module from a cage to enable the module to be extracted from the cage, the method comprising:
providing an optical transceiver module mated with a cage, the cage having first and second side walls, a top and a bottom, the module comprising:
an elongated delatching pull tab comprising:
an elongated handle having a proximal end and a distal end, the elongated handle having a substantially rigid structure; and
a pair of cantilever spring arms disposed on the distal end of the elongated handle, the pair of cantilever spring arms being capable of being positioned in an unloaded state and in a fully-loaded state;
a slider having first and second side slide members that are in parallel planes and a transverse member interconnecting the first and second side slide members, the transverse member being mechanically coupled to the distal end of the elongated handle, the first and second side slide members having delatching features formed thereon; and
a module housing mechanically coupled to the slider and to the distal end of the elongated handle;
and
exerting a force on the proximal end of the elongated handle in a first direction and with a magnitude sufficient to cause the pair of cantilever spring arms to be positioned in the fully-loaded state, wherein exertion of the force causes the slider to be pulled in a direction that is parallel to the first direction thereby causing the delatching features formed on the first and second side slide members to press outwardly against the first and second side walls of the cage to delatch the module housing from the cage.

12. The method of claim 11, wherein if the force exerted on the proximal end is removed, the pair of cantilever spring arms repositions itself into the unloaded state.

13. The method of claim 11, wherein the elongated delatching pull tab is a unitary piece part of which the elongated handle and the pair of cantilever spring arms are integral parts.

14. The method of claim 11, wherein the elongated handle and the pair of cantilever spring arms are separate parts.

15. The method of claim 11, wherein the delatching pull tab is made of plastic.

16. The method of claim 11, wherein the delatching pull tab is made of a metallic material.

17. The method of claim 11, wherein the transverse member of the slider is mechanically coupled to the distal end of the elongated handle by a tab on the transverse member that hooks through a slot formed in the distal end of the elongated handle.

18. The method of claim 11, wherein the delatching features formed on the first and second side slide members are first and second ramps that extend outwardly away from the first and second side slide members.

19. The method of claim 11, wherein the module housing comprises first and second housing portions that are fixedly secured to one another, and wherein the distal end of the elongated handle is mechanical coupled to a bottom surface of the second housing portions.

20. The method of claim 19, wherein the bottom surface of the second housing portion has a recess formed therein in which the pair of cantilever spring arms sit, and wherein the transverse member of the slider at least partially covers the recess to maintain the pair of cantilever spring arms in the recess, the recess having a shape and size that allows the pair of cantilever spring arms to move within the recess between the unloaded and fully-loaded states.

* * * * *